United States Patent [19]

Würth

[11] Patent Number: 4,578,853

[45] Date of Patent: Apr. 1, 1986

[54] METHOD OF MAKING A STACK OF ELECTRICAL SHEET-METAL LAMELLAE WITH ALIGNED WINDING SLOTS, PARTICULARLY ARMATURES FOR DYNAMO ELECTRIC MACHINES

[75] Inventor: Hans Würth, Ludwigsburg, Fed. Rep. of Germany

[73] Assignee: Robert Bosch GmbH, Stuttgart, Fed. Rep. of Germany

[21] Appl. No.: 503,177

[22] Filed: Jun. 10, 1983

[30] Foreign Application Priority Data

Jul. 24, 1982 [DE] Fed. Rep. of Germany ....... 3227681

[51] Int. Cl.$^4$ .............................................. A02K 15/14
[52] U.S. Cl. ...................................... 29/598; 29/609; 310/42; 310/216
[58] Field of Search .......................... 29/596, 598, 609; 310/216, 217, 42, 261, 264

[56] References Cited

U.S. PATENT DOCUMENTS 2,808,616 10/1957 Baldasarre et al. ................... 29/125
2,975,312 3/1961 Ploran .................................... 29/609
3,202,851 8/1965 Zimmerle et al. ................ 29/609 X

FOREIGN PATENT DOCUMENTS 2708017 2/1977 Fed. Rep. of Germany.

Primary Examiner—Mark Rosenbaum
Assistant Examiner—Timothy V. Eley
Attorney, Agent, or Firm—Frishauf, Holtz, Goodman & Woodward

[57] ABSTRACT

To provide for precise alignment, with easy assembly of stacks of lamellae which form, for example, the armature of a dynamo electric machine, so that the winding slots will be aligned and the lamellae held together by frictional engagement and interlocking engagement of projections and recesses, the recesses are formed by a deformation process in which, first, holes are punched into the lamella elements at each location where the recesses—projections or bulges are to be placed, the holes being smaller than the recesses or projections and located centrally with respect thereto. The edge zones of the holes are then deformed so that the edge zones will have, along a diametrical line, at least approximately part V or roof shape, thereby forming corresponding projections at the other sides of the strip, the angle of the V or roof-shaped surfaces being about 120°. The height of the projection is at least approximately equal to the thickness of any lamella, and the projection is defined by a ridge which extends radially with respect to the longitudinal axis of the opening from both sides of the opening to the outer surface of the projection.

11 Claims, 5 Drawing Figures

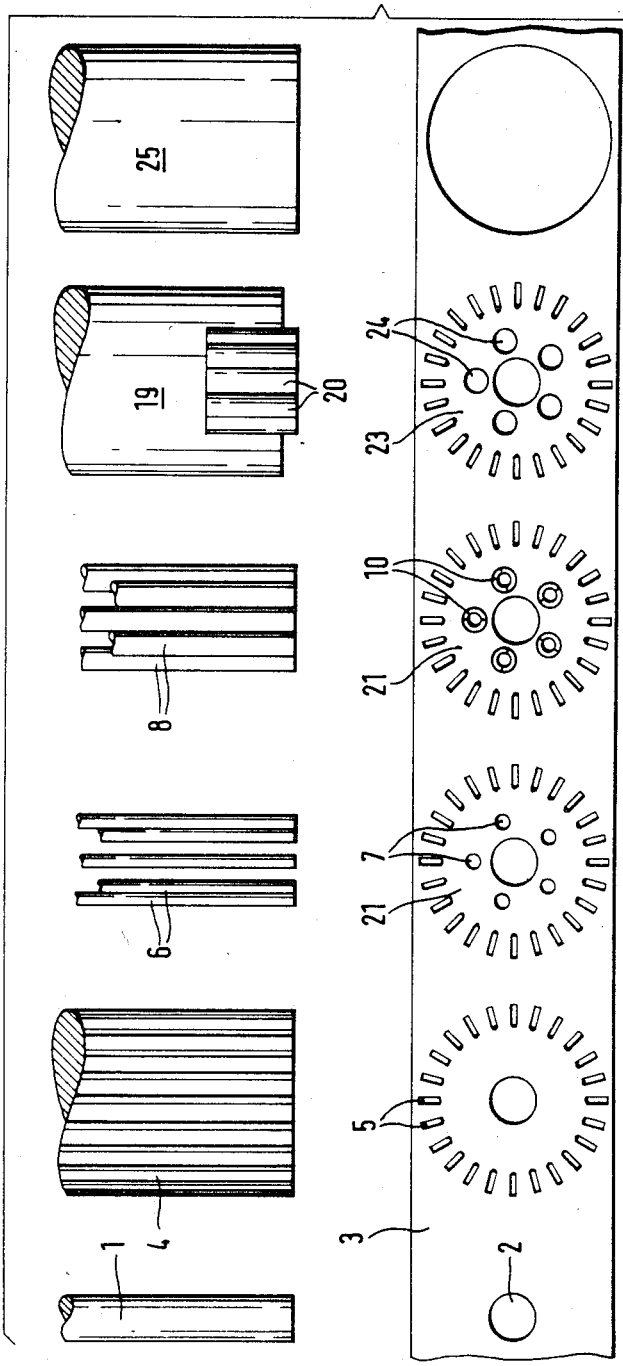

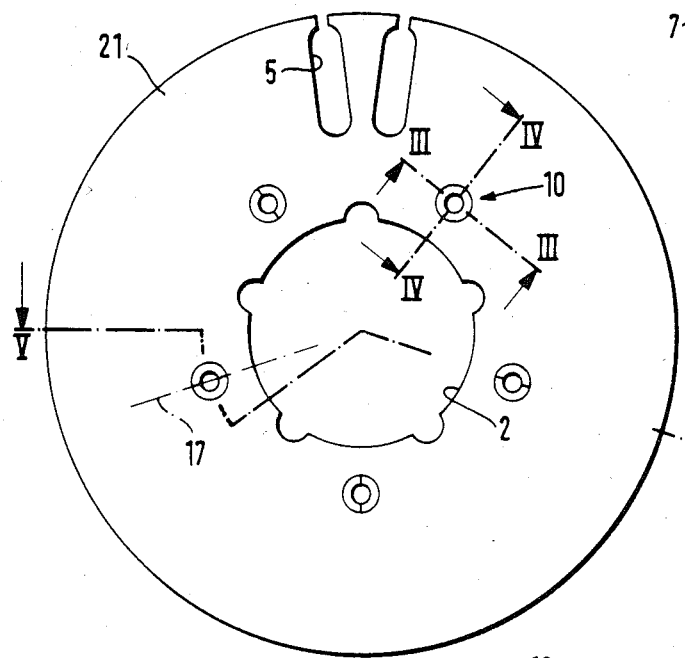
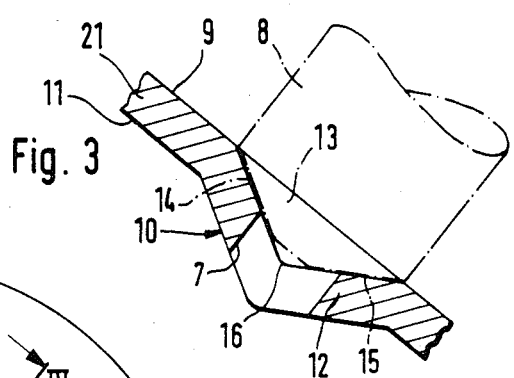
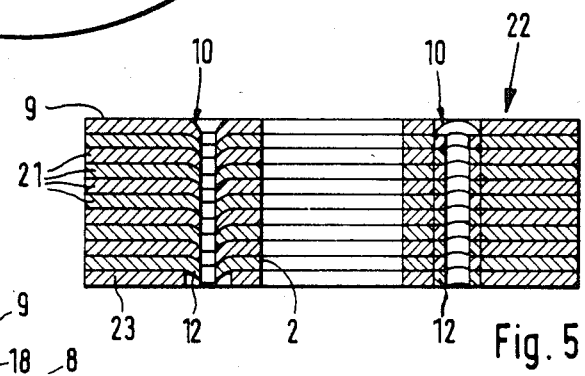
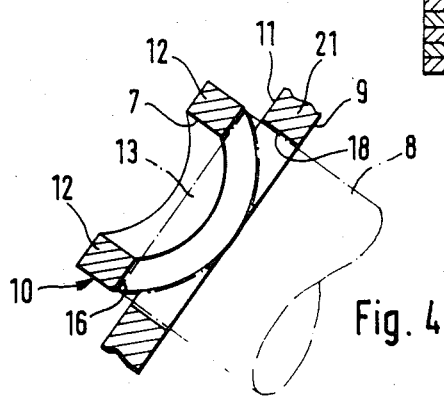

METHOD OF MAKING A STACK OF ELECTRICAL SHEET-METAL LAMELLAE WITH ALIGNED WINDING SLOTS, PARTICULARLY ARMATURES FOR DYNAMO ELECTRIC MACHINES

The present invention relates to a method to make stacked sheet metal lamellae for electrical equipment, and particularly for dynamo electric machines, especially armatures in which the lamellae have winding slots formed therein, the method providing a stack of a predetermined number of electrical sheet-metal lamellae in which the winding slots are precisely aligned.

BACKGROUND

In order to provide cores for electromagnetic structures which are subjected to alternating current fields, it has been proposed to make the cores of stacks of electrical sheet-metal elements, in which the respective sheet-metal elements are insulated from each other in order to reduce eddy losses. To provide for precise alignment of stacks which also include winding slots, so that the windings can readily be placed into the stacks, it has been proposed to deform the respective sheet-metal elements or lamellae by punch marks, in the form of blind holes, which, at the opposite sides of the sheet-metal elements, will result in essentially cylindrical bumps or projections. It has been found that, upon interengaging the projections of one sheet-metal element with the blind hole of the next adjacent one, electrical connection between the superimposed sheets may result, thus increasing eddy current losses of the overall package.

THE INVENTION

It is an object to improve a process of making stacked lamellae in which interengaging projections and recesses are formed in the respective sheet-metal elements to be stacked, the method providing for so forming the arrangement that electrical connection between superimposed lamellae is effectively prevented, so that eddy current losses are a minimum, while, at the same time, resulting in an economical manufacturing process requiring little operating energy.

Briefly, a sheet of electrical steel or sheet metal, typically insulated on one or both sides with a covering of insulating varnish or lacquer, is deformed at one side by forming therein recesses which, on the opposite side, result in corresponding bulging or projecting regions. In accordance with the present invention, the deforming step includes the step of punching holes into the respective lamella element at each location where the recess-bulge or projection deformation is to occur, the holes being smaller than the recess or projection, and located centrally with respect thereto. The deforming step, then, includes deforming the edge zones of the holes on the side of the strip which is to cause the projection to have, along a diametrical line, at least approximately part of V-shape, and thereby forming corresponding projections on the other side of the sheet-metal or strip element. The lamellae can readily be stacked; a terminal or final sheet-metal or lamella element is formed in which the hole has the same size as the V-shaped depression, to receive the projection of an adjacent element, so that a final stack is obtained which is essentially flush. The number of deformations which are essentially V-shaped can be counted and, after the count number has been reached, the last one can be punched through with the same or a different punching die, thereby automatically providing the stack with the requisite number of lamellae elements.

The system has the advantage that the particular shape of the deformation, which results in the corresponding projection on the other side of the lamella, is so formed that the material which is deformed upon forming the depression can readily form the projecting portion on the other side without interfering with the insulating coating, so that the electrical separation of the respective lamellae remains effective. Additionally, the lamellae can be pressed against each other with only reasonable pressure, since the projections will match precisely into the depression of an adjacent lamella, and no air gap, which might cause operating noise or increase of the height of the stack between adjacent lamellae will result. The type of deformation forms a connection which is similar to a snap or pressure snap connection, and provides for precise orientation of adjacent lamella with respect to each other, so that any winding slots which have been formed in the elements will, also, be in precise alignment. Pre-forming the hole at the position where the depressions—and the corresponding projections—are to be made has the advantage that the forces which are necessary to assembly the sheets to a complete stack against each other are low, so that the energy required to make the stack is likewise low. The more formation of a hold or bore or opening in the center of the zone where the depression—and corresponding projection—is to be formed results in ready and form-fitting acceptance of the projection of a lamella in the recess of a next adjacent one, while retaining electrical isolation between the superimposed sheet or lamella elements.

DRAWING

FIG. 1 illustrates, in side view the punching tools, and in top view, a sheet metal strip, showing, the tools and manufacturing steps at sequential work stations to form an armature stack assembly for a dynamo electric machine, in simplified, part-schematic representation;

FIG. 2 is a top view of a single lamella;

FIG. 3 is a cross section along the line III—III of FIG. 2 to an enlarged scale;

FIG. 4 is a cross section along line IV—IV of FIG. 2 to an enlarged scale; and

FIG. 5 is a package of lamellae, assembled, and cut in the section along line V—V of FIG. 2, in which it is to be noted that FIG. 5 is a broken sectional line which extends circumferentially through one of the projection-recess interlocks and radially through another one.

DETAILED DESCRIPTION

A strip 3 (FIG. 1) of electrical sheet steel, for example having one or both sides coated with an insulating lacquer or varnish, is placed on a production line. A first hole punch 1 punches a central opening 2 into the metal strip 3. This opening, later on, is to receive the shaft of the armature which is to be made. A groove punch 4 then punches the winding slots 5, concentrically to the central opening 2. The winding slots 5 are uniformly distributed about the circumference of the armature. This far, the steps are conventional.

In accordance with a feature of the invention, a hole punch 6, for example having five punching elements, then punches five holes 7 into the pre-formed armature lamella. The holes 7 are uniformly spaced about the center of the hole 2 and located on a circle concentric with hole 2. The angular distance between adjacent holes 7 is identical.

In a next operating step, deformation punches 8 are applied to the edges of the holes 7. There are, again, five deformation punches 8, each one operating concentrically with respect to the holes 7 to form on one side 9 of the metal strip five depressions 10, see FIG. 3. The deformation punches 8, in this punching operation, do not remove the metal but, rather, form projections 12 at the opposite side 11 of the metal strip 3, best seen in FIGS. 3 and 4. These projections 12 have a height or projecting distance which is at least as great as that of the thickness of the metal strip 3.

Referring to FIGS. 3 and 4, which show, respectively, fragmentary cross sections through a sheet-metal element to an enlarged scale, and rotated with respect to each other by 90°: The deformation stamps 8 (see FIG. 3) all have circular cross section. Their end portions terminate in a shallow V-shaped roof-like projection 13. The flanks 14, 15 of this roof-shaped end portion preferably form an angle of about 120°. The flanks 14, 15 are of the same size. The edge adjacent the hole 7 is deformed to a somewhat rounded ridge or peak line 16. The depressions 10, thus, have generally V-shaped cross section. A sectional plane, which passes through the central axis thereof, extends perpendicularly to a line 17 (FIG. 2) and connects the central axis or center point of the central opening 2 and the center of the depression 10—see FIGS. 2 and 3. The depression 10 is cut through in the direction of the radial line 17 at the edge portions 18 of the circular circumference of the depression 10—see FIG. 4.

A third punch element 19 is coupled to a stroke counter. Punch 19 has five single punch elements 20 which precisely match the position of the depressions 10. After having counted a number of punching operations of the punches 8, punch 19 is operated to completely cut through the depressions and form through-holes from the depressions 10. The number after which punch 20 operates corresponds to the number of lamellae which are to be stacked together to a common armature stackless one.

A circumferential punch 25 then cuts out the lamellae 21, 23 from the metal strip, for stacking to form a lamella package 22 (FIG. 5) which are assembled in a stack 22. Under frictional engagement, and upon simultaneous compression of the lamellae through a matrix with increased axial counter pressure, the lamellae form the stack 22, in which the last one with the enlarged holes 22 forms the lowermost element of the stack to receive the projections of the next adjacent upper lamella—see FIG. 5. The final assembly of the lamellae in the stack can be in accordance with any suitable and well known technology.

Since only one lamella 23 having the holes 24 can be connected at the side 9 with a lamella 21 having the projections 12, the separation and subdivision of the lamella package 22, derived after operation of the last punching step by punch 25, becomes automatic. It is not necessary anymore to connect the lamellae together with rivets, weld connections, or the like. The lamellae, due to the interengaging projections fitting into the corresponding matching recesses, all made by the same machinery, will have excellent alignment of the winding slots 5. The precisely aligned lamellae 21, 23, forming the package 2, can be applied to the armature shaft with only small attachment pressure, without danger of deformation or bending of the armature shaft. Any final manufacture of the lamellae package can be done before assembling the package on the armature shaft. For example, the lamallae package 22 may have the windings applied thereto prior to being drawn on the armature shaft.

The invention has been described in sequential steps, in connection with a production line in which sequentially arranged separate tools are used. Of course, at least some of the cutting and deformation operations can be combined, and single tools may be used to punch and assembly the lamellae, and to separate sequential packages 22 of the stacks from each other.

I claim:

1. Method of making an armature core for a dynamo electric machine in the form of a stack of electrical sheet-metal elements by deriving said lamella from a strip (3) of electrical sheet metal, and wherein a predetermined number of said lamella elements are identical and a different and final lamella element, of similar configuration, is assembled with said predetermined number to make the stack;

comprising the step of punching the strip to preform the lamella elements of a desired configuration, including forming a central hole (2) for an armature shaft, and forming winding slots (5) in the strip;

deforming a predetermined number of said lamella elements having a predetermined relation to the number of lamella elements to form an armature by forming recesses on one side of the strip which result in corresponding projecting regions on the other side of the strip;

punching holes in the different or final lamella element at the location of the projecting regions in the other lamella elements;

severing said lamella elements from the strip;

and wherein said deforming step comprises punching a hole into the lamella element at each location of the recess projecting region, which is smaller than said recess projecting region, and located centrally with respect thereto;

and then deforming the edge zones of the holes on said one side of the strip to form said recesses with a shape which has, along a diametrical line, at least approximately part V shape, and thereby forming corresponding projections on the other side of the strip;

assembling and compressing together said lamella elements in a stack with the different and final element being located at an end position of the stack in which the projecting regions of the preceding lamella element enter the holes of the final element, and interlocking adjacent lamella elements to retain the adjacent lamella elements together in the stack;

and assembling the stack of interlocked lamella elements on an armature shaft, whereby the armature slots in the individual lamella elements will be precisely aligned, spurious short circuits between adjacent lamella elements will be essentially avoided and the lamella elements interlocked by the projections engaged in and entering the recesses.

2. Method according to claim 1, wherein said step of deforming the edge zones comprises deforming said zones in a shape to form a projecting ridge zone which extends to the outer circumference of the projecting zone, and radially to be longitudinal axis of the hole, the ridge zone being deformed from the surface defining the depression by at least the thickness of the respective lamella.

3. Method according to claim 1, wherein the V shaped surfaces form an angle of about 120°, joined to each other at said ridge zone.

4. Method according to claim 1 wherein the lammella are circular and have a central opening (2);

and wherein the step of forming the recesses approximately part of V shape comprises deforming said edge zone with the apex of the V shape extending radially with respect to the central opening (2).

5. Method of making a stack of electrical sheet-metal lamellae by deriving lamella elements from a plate of electrical sheet-metal (3), and wherein a predetermined number of said lamella elements are identical and a different and final lamella element of similar configuration is assembled with said predetermined number of lamellae to make the stack;

comprising the steps of
punching the plate to pre-form the lamella elements of a desired configuration;
deforming said lamella elements by forming recesses on one side of the plate which result in corresponding projecting regions on the other side of the plate;
punching holes in the different or final lamella element at the location of the projecting regions in the remaining lamella elements;
severing said lamella elements from the plate;
and wherein
said deforming step comprises
punching a hole into the lamella element at each location of the recess-projecting region, which is smaller than said recess-projecting region, and located centrally with respect thereto;
and then deforming the edge zones of the holes on said one side of the strip to form said recesses with a shape which has, along a diametrical line, at least approximately part of V shape, and thereby forming corresponding projections on the other side of the strip;
and assembling and compressing together said lamella elements in a stack with the different and final element being located at an end position of the stack in which the projecting regions of the preceding lamella element enter the holes of the final element, and interlocking adjacent lamella elements to retain the adjacent lamella elements together in the stack.

6. Method according to claim 5, wherein said step of deforming the edge zones comprises deforming said zones in a shape to form a projecting ridge zone which extends to the outer circumference of the projecting zone, and radially to the longitudinal axis of the hole, the ridge zone being deformed from the surface defining the depression by at least the thickness of the respective lamella.

7. Method according to claim 6, wherein the V shaped surfaces form an angle of about 120°, joined to each other at said ridge zone.

8. Method according to claim 5, wherein said stack comprises part of a dynamo electric machine, wherein the step of punching the plate comprises forming winding slots in the lamella elements, and is carried out prior to carrying out said step of deforming the edge zones of the holes.

9. Method according to claim 5 wherein the lamella are circular and have a central opening (2);

and wherein the step of forming the recesses of approximately part of V shape comprises deforming said edge zone with the apex of the V shape extending radially with respect to the central opening (2).

10. A stack of electrical sheet-metal lamella elements having winding slots (5) for placement of electrical windings therein and an aligned opening (2);

wherein the individual lamella elements are formed with depressions on one side thereof and corresponding projections on the other, the projections on the other side of any lamella element engaging the depressions in the next adjacent one, and a final lamella is provided, having an opening receiving the projection of the next adjacent lamella element, wherein said lamella elements are formed by deforming that number thereof which will form the stack of electrical sheet metal lamella elements, less one, said lamella elements being severed from a strip of electrical sheet steel, and the lamella elements are formed with recesses on one side of the strip which result in corresponding projecting regions on the other side of the strip by a punching operation, said lamella elements being severed from the strip and assembled together in the stack with a different and final lamella located at an end position of the stack in which the projecting region of a next preceding lamella element enters holes of the final element, the stack being assembled together;

and wherein the recesses and corresponding projecting regions are generated by punching a hole into individual lamella elements at each location of the recess—projecting region, which is smaller than said recess—projecting region, and located centrally with respect thereto, the edge zones of the holes on that side of the strip which will form the recess are shaped to have, along a diametrical line, at least approximately part V shape, to thereby form corresponding projections on the other side of the strip, said lamella elements all being assembled and compressed together into said stack, with the different and final element being located at an end position of the stack in which the projecting regions of the preceding lamella element enter the holes of the final element, and interlocking adjacent lamella elements to retain the adjacent lamella elements together in the stack, the armature slots in the individual lamella elements being aligned, said individual elements being essentially electrically separated from each other, and the lamella elements being interlocked by the projections engaged in and entering the recesses.

11. Stack according to claim 10, wherein the V-shaped surfaces adjacent the ridge include an angle of about 120° with respect to each other.

* * * * *